(12) United States Patent
Onagawa

(10) Patent No.: US 7,215,774 B2
(45) Date of Patent: May 8, 2007

(54) VIDEO DATA TRANSFER CONTROL SYSTEM AND METHOD

(75) Inventor: Seiki Onagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 857 days.

(21) Appl. No.: 10/115,132

(22) Filed: Apr. 4, 2002

(65) Prior Publication Data
US 2002/0146131 A1    Oct. 10, 2002

(30) Foreign Application Priority Data
Apr. 4, 2001    (JP) .............................. 2001-106003

(51) Int. Cl.
*H04N 7/16*    (2006.01)
(52) U.S. Cl. ........................................ 380/210; 725/31
(58) Field of Classification Search ................. None
See application file for complete search history.

(56) References Cited

U.S. PATENT DOCUMENTS

| 4,646,147 A | * | 2/1987 | Kruger | 380/216 |
| 4,716,588 A | * | 12/1987 | Thompson et al. | 380/224 |
| 4,839,922 A | * | 6/1989 | Imasaki et al. | 380/223 |
| 4,962,529 A | * | 10/1990 | Saeki et al. | 380/226 |
| 5,706,346 A | * | 1/1998 | Katta et al. | 380/217 |
| 6,069,956 A | * | 5/2000 | Kurihara | 380/212 |

FOREIGN PATENT DOCUMENTS

| JP | 6-169307 | 6/1994 |
| JP | 9-130733 | 5/1997 |
| JP | 11-176092 | 7/1999 |
| JP | 2000-358227 | 12/2000 |
| JP | 2001-86481 | 3/2001 |

* cited by examiner

*Primary Examiner*—Kambiz Zand
*Assistant Examiner*—Brandon S Bludau
(74) *Attorney, Agent, or Firm*—Whitham Curtis Christofferson & Cook, P.C.

(57) ABSTRACT

A video data transfer control system allowing secure protection of video data from unauthorized copying is disclosed. A scrambling key used to scramble video data is stored in a key register and a new scrambling key is stored in a register. At the timing of a vertical sync signal of the video data, the scrambling key is changed to the new one. As a result, the scrambling key can be frequently changed while transferring the video data, achieving enhanced protection of the video data from unauthorized copying.

11 Claims, 4 Drawing Sheets

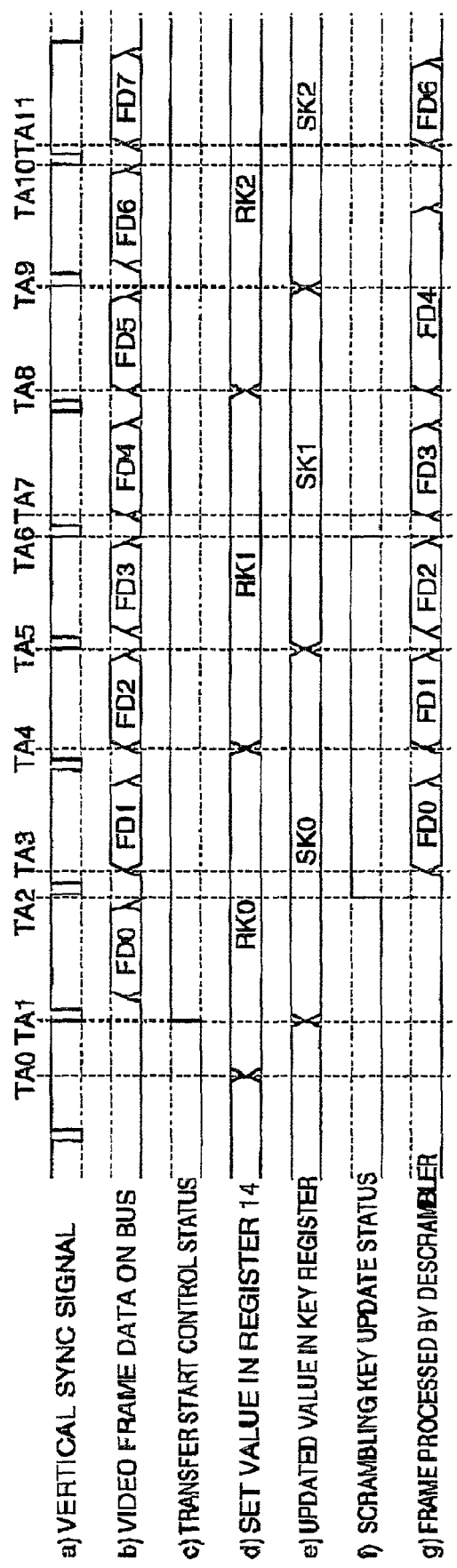

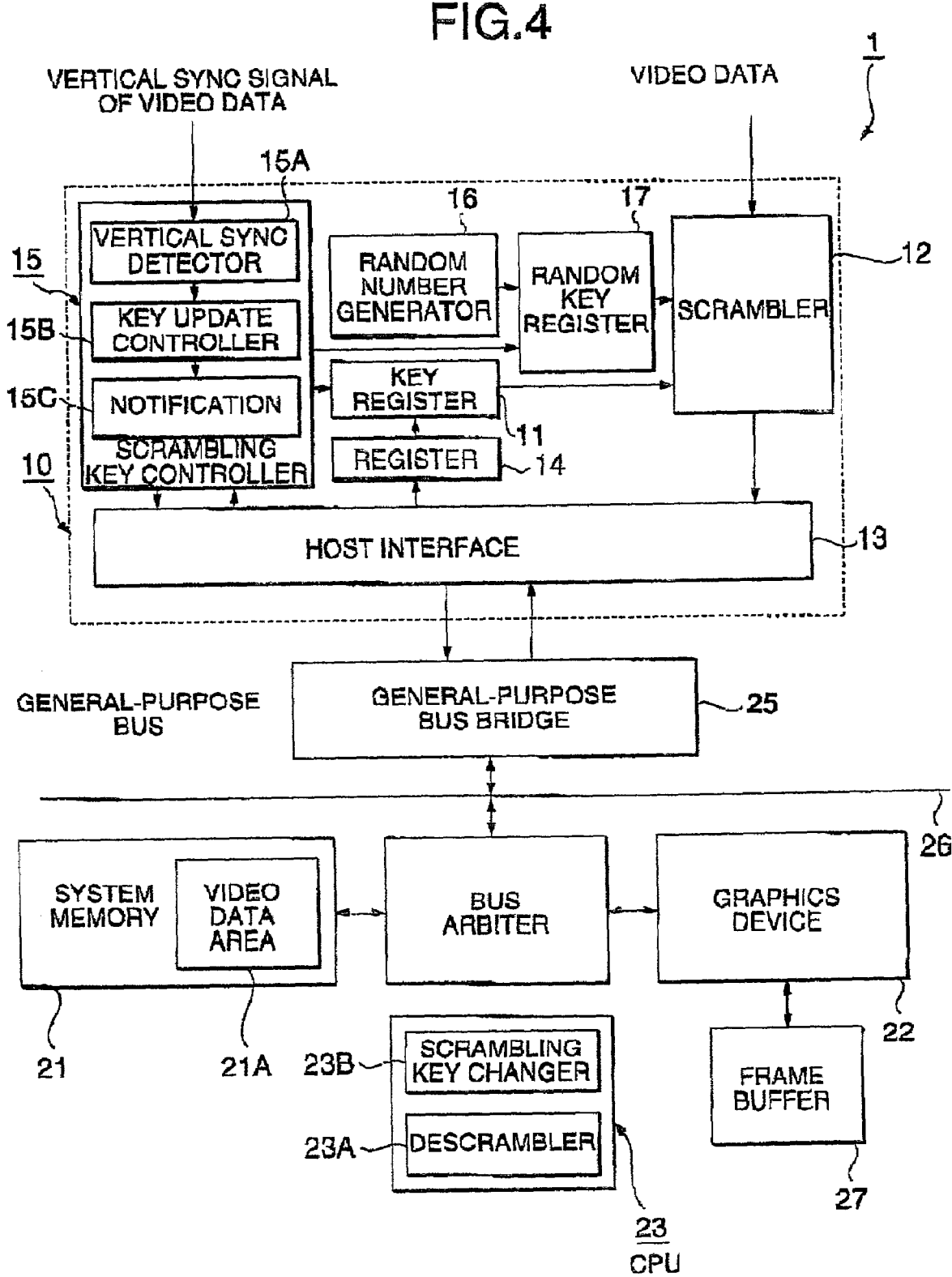

VIDEO DATA TRANSFER CONTROL SYSTEM AND METHOD

BACKGROUND OF THE INVENTION

1. Field of the Invention

The present invention related to video technologies on a computer such as a personal computer and in particular to a video data transfer control system and method allowing video data to be rendered on a display in overlaying fashion.

2. Description of the Related Art

There have been proposed video data transfer controllers having a scrambling/descrambling function to protect the video data from unauthorized copying. More specifically, video data is scrambled by a scrambler and the scrambled video data is transferred through a general-purpose bus. The scrambled video data is descrambled by a descrambler and the original video data is output to a graphics device.

For example, Japanese Patent Application Unexamined Publication No. 6-169307 discloses an encoding/decoding device that changes randomly or at regular intervals an encryption key for encrypting a scrambling key. The video data is scrambled using the scrambling key and the scrambling key is encrypted using the encryption key that changes randomly or at regular intervals. The scrambled video data is transferred through a data bus. The encrypted scrambling key is also transferred and decrypted to produce the scrambling key, which is used to descramble the scrambled video data.

Japanese Patent Application Unexamined Publication No. 9-130733 discloses a data reproducing device that allows a scrambling key to be changed at the timing of transfer instruction of a series of scrambled data. More specifically, the scrambling key is generated by a random data generator when a drive controller has received a read-out instruction from a host computer. It should be noted that a series of data to be transferred to a decoder is stored in a memory of the host computer and thereby there is a time lag between data generation and data decoding. This means that the scrambling key cannot always be changed. Accordingly, the timing of changing the scrambling key is restricted to when a transfer instruction of the series of data is detected. As the result, a new scrambling key has been transferred to the decoder before the series of scrambled data is transferred to the decoder through the memory of the host computer.

In the above prior arts, however, it is not sufficient to protect the video data from unauthorized copying. In the case of the encoding/decoding device disclosed in Japanese Patent Application Unexamined Publication No. 6-169307, when the encryption key has been known by a malicious user, it is easy to copy the video data. Even in the case where the scrambling key itself is changed as disclosed in Japanese Patent Application Unexamined Publication No. 9-130733, the timing of changing the scrambling key is restricted to when a transfer instruction of the series of data is detected and therefore it is not so difficult to descramble the scrambled video data.

SUMMARY OF THE INVENTION

An object of the present invention is to provide a video data transfer control system and method allowing secure protection of video data from unauthorized copying.

To achieve the above object, the inventor found that the scrambling key can be changed during transfer of video data at the timing of a vertical synchronizing signal of the video data. Since the scrambling key can be frequently changed while transferring the video data to the graphics device through the general-purpose bus, the enhanced protection of the video data from unauthorized copying is achieved.

According to an aspect of the present invention, a control system for transfer of scrambled video data through a data transfer line, includes: a vertical sync detector for detecting a vertical sync signal from the video data; a scrambling key update controller for updating a scrambling key to a new scrambling key as a current scrambling key at a vertical sync timing determined depending on the vertical sync signal; a scrambler for scrambling video data using the current scrambling key to produce scrambled video data, which is transferred to the data transfer line; and a descrambler for descrambling the scrambled video data received through the data transfer line based an the current scrambling key to produce original video data.

According to another aspect of the present invention, a control system for transfer of scrambled video data through a data transfer line, includes: a scrambling key changer for changing a current scrambling key to a new scrambling key; a first key memory for storing the current scrambling key that is used to scramble video data; a second key memory for storing the new scrambling key received from the scrambling key changer; a vertical sync detector for detecting a vertical sync signal from the video data; a memory controller for replacing the current scrambling key stored in the first key memory with the new scrambling key stored in the second key memory as a current scrambling key at a timing determined depending on the vertical sync signal; a scrambler for scrambling video data using the new scrambling key to produce scrambled video data, which is transferred through the data transfer line; and a descrambler for descrambling the scrambled video data received through the data transfer line based on the new scrambling key to produce original video data.

The memory controller may control such that the first key memory stores the new scrambling key from the second key memory during vertical blanking determined depending on the vertical sync signal.

The memory controller may notify the descrambler that the current scrambling key has been replaced with the new scrambling key in the first key memory.

The control system preferably further includes: a random number generator for generating a random number; and a third key memory for storing a random key that is a random number generated by the random number generator when the memory controller replaces the current scrambling key with the new scrambling key, wherein the scrambler scrambles the video data using the current scrambling key and the random key and the descrambler descrambles the scrambled video data based on the current scrambling key and the random key.

The descrambler may be notified that the new scrambling key has been stored as a current key scrambling key in the first key memory and a combination of the new scrambling key and the random key is used to scramble the video data.

According to still another aspect of the present invention, a control method for transfer of scrambled video data through a data transfer line, includes the steps of: determining whether a current scrambling key is changed to a new scrambling key; when the current scrambling key is changed to a new scrambling key, determining whether a vertical blanking period is detected from the video data; when the vertical blanking period is detected, setting the new scrambling key as a current scrambling key during vertical blanking; scrambling video data using the new scrambling key to produce scrambled video data; transferring the scrambled video data through the data transfer line; and descrambling the scrambled video data received through the data transfer line based on the new scrambling key to produce original video data.

The video data may comprise a plurality of frames of video data synchronizing to a vertical sync signal, wherein a frame of video data is scrambled using the new scrambling key during a frame period, and a frame of scrambled video data is descrambled based on the new scrambling key during a subsequent frame period.

When a previous scrambling key is replaced with the new scrambling key during vertical blanking between a first frame period and a second frame period, update status information indicating occurrence of a scrambling key change may be created, wherein a first frame of scrambled video data is descrambled in the second frame period based on the previous scrambling key; and a second frame of scrambled video data is descrambled in a third frame period following the second frame period based on the new scrambling key.

BRIEF DESCRIPTION OF THE DRAWINGS

FIG. 3 is a timing chart showing an operation of the video data transfer control system according to the first embodiment; and FIG. 4 is a block diagram showing a video data transfer control system according to a second embodiment of the present invention.

DESCRIPTION OF THE PREFERRED EMBODIMENTS

Figure 1:
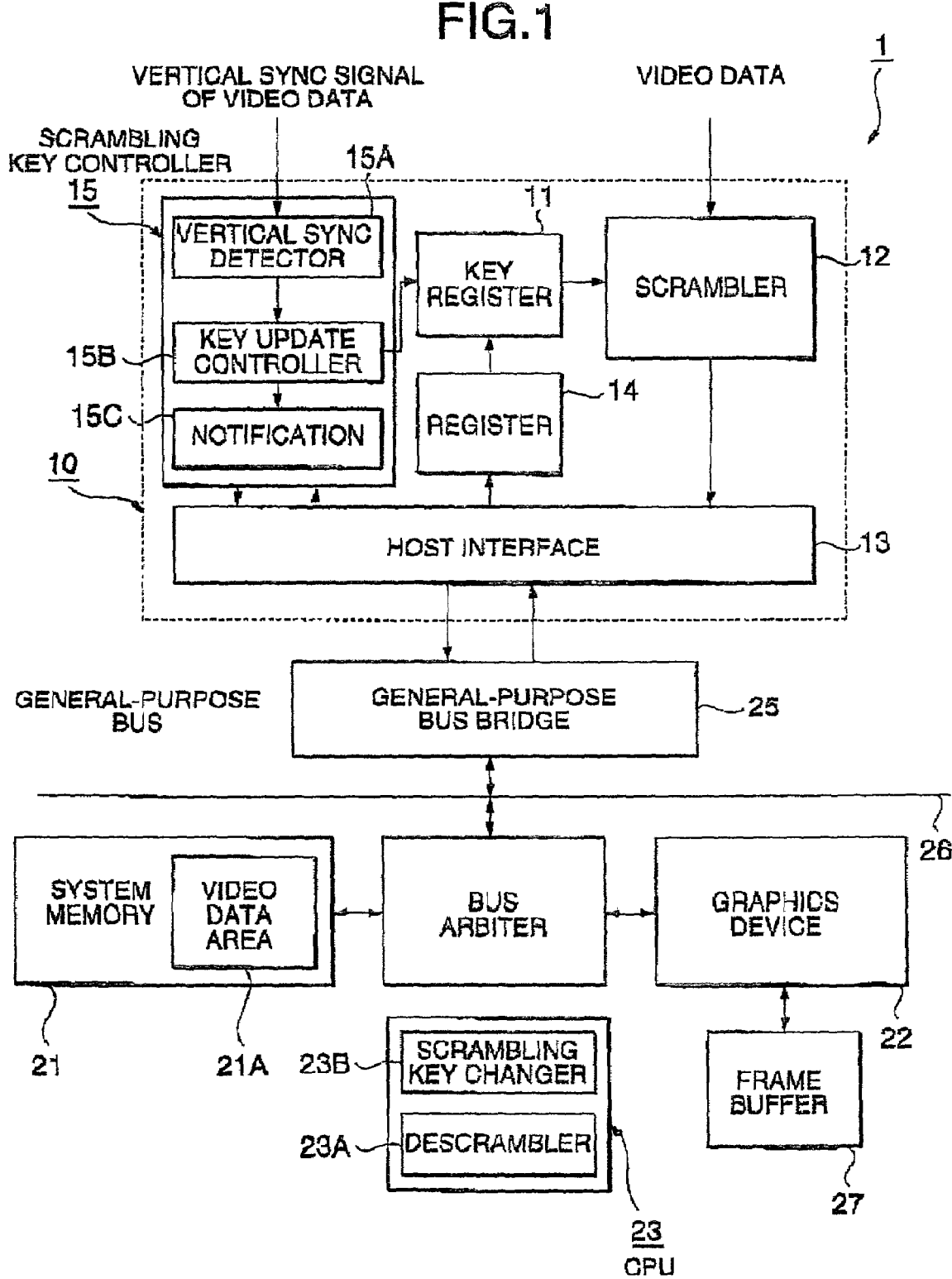
FIG. 1 is a block diagram showing a video data transfer control system according to a first embodiment of the present invention.

Referring to FIG. 1 a video data transfer control system 1 according to a first embodiment of the present invention includes a video data sending device 10 which is connected to a general-purpose bus 26 through a general-purpose bus bridge 25. A bus arbiter 24 is also connected to the general purpose bus 26. A system memory 21 including a video data area 21A, a graphics device 22, and a program-controlled processor (here, CPU) 23 are connected to the bus arbiter 24. The graphics device 22 has a frame buffer 27 connected thereto.

The video data sending device 10 inputs video data and its vertical synchronizing signal, and scrambles the video data using a current scrambling key, which may be updated at the vertical sync timing as described later. The scrambled video data is transferred to the video data area 21A of the system memory 21 by the general-purpose bus bridge 25 using DMA (Direct Memory Access) function through the general-purpose bus 26. The scrambled video data stored in the video data area 21A is read out and descrambled by the CPU 23 based on the current scrambling key. The graphics device 22 stores the descrambled video data in units of a frame into the frame buffer 27 and performs graphics processing of the video data for overlay-displaying on the screen of a personal computer (not shown).

The CPU 23 executes control programs for controlling the system 1, including a descrambler program and a scrambling key changer program to implement a descrambler 23A and a scrambling key changer 23B. The descrambler 23A descrambles the scrambled video data stored in the video data area 21A of the system memory 21 based on the current scrambling key as described above. The scrambling key changer 23B creates a new scrambling key while holding the current scrambling key and sends the new scrambling key to the video data sending device 10 through the bus arbiter 24, the general-purpose bus 26, and the general-purpose bus bridge 25. The bus arbiter 24 arbitrates data transfer through the general-purpose bus 26.

The video data sending device 10 includes a key register 11 for storing a current scrambling key and a scrambler 12 for scrambling the input video data using the current scrambling key. The scrambler 12 may be composed of one or a combination of an exclusive-OR circuit, an adder and a subtracter.

The scrambled video data is transferred to the general-purpose bus bridge 25 through a host interface 13. A new scrambling key received from the CPU 23 through host interface 13 is stored in a register 14. A scrambling key controller 15 controls the whole operation of the video data sending device 10.

The scrambling key controller 15 includes a vertical sync detector 15A, a key update controller 15B, and a notification section 15C. The vertical sync detector 15A detects a vertical sync signal of the video data to output a vertical sync detection signal to the key update controller 15B. When receiving the vertical sync detection signal, the key update controller 15B instructs the key register 11 to replace the current scrambling key with the new scrambling key stored in the register 14 during vertical blanking. In other words, the new scrambling key is stored as a current scrambling key in the key register 11.

When the scrambling key has been updated, the notification section 15C sends update status information to the CPU 23 to notify the descrambler 23A that the current scrambling key of the scrambler 12 has been changed to the new one.

The above arrangement of the system 1 allows frequent changes of scrambling keys during transfer of video data from the video data sending device 10 to the graphics device 22. A scrambling key update operation will be described in detail with reference to FIG. 2.

Figure 2:
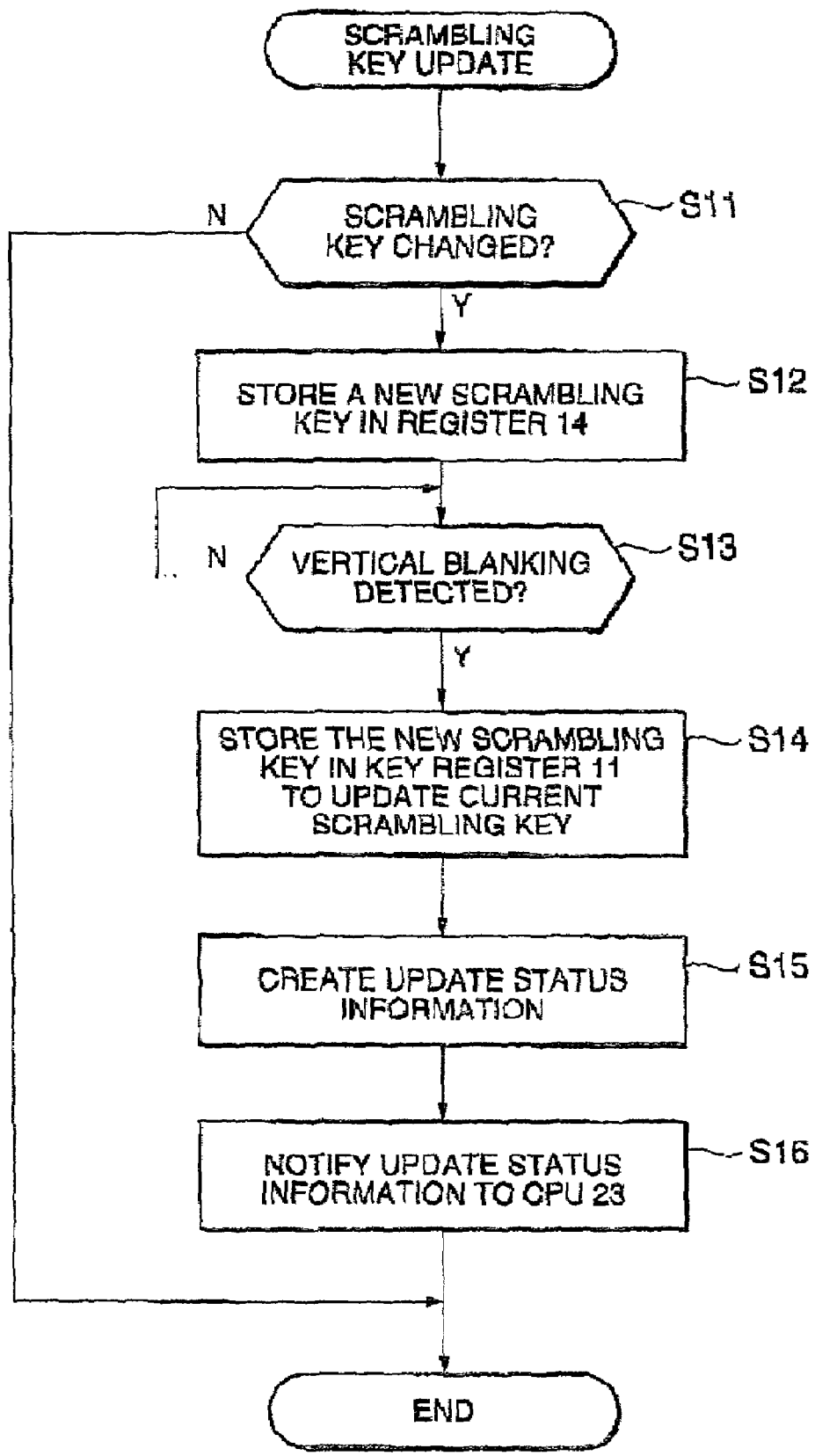
FIG. 2 is a flow chart showing a scrambling key updating operation employed in the video data transfer control system according to the first embodiment of the present invention.

Referring to FIG. 2, it is determined whether the current scrambling key has been changed to a new one by the scrambling key changer 23B (step S11). When it has been changed (Y in step S11), a new scrambling key received from the scrambling key changer 23B through the host interface 13 is stored into the register 14 (step S12).

Thereafter, the key update controller 15B determines whether a vertical blanking period is detected based on the vertical sync detection signal received from the vertical sync detector 15A (step S13). When detected (Y in step S13), the key update controller 15B instructs the key register 11 to update the current scrambling key to the new scrambling key stored in the register 14 during the detected vertical blanking (step S14).

When the current scrambling key has been updated, the notification section 15C creates update status information (step S15) and sends it to the descrambler 23A of the CPU 23 (step S16). After the step S16 or when the current scrambling key is not changed (N in step S11), the scrambling key update routine is terminated.

Next, an operation of the video data transfer control system 1 will be described with reference to FIG. 3.

Referring to FIG. 3, at time TA0, it is assumed that a new scrambling key (here, an initial scrambling key RK0) is set in the register 14 as shown in FIG. 3(d).

At a time TA1 that is a vertical sync timing, the CPU 23 starts controlling the transfer of video data by setting a transfer start control status to high. Since the time TA1 is included in a vertical blanking period, the key update controller 15B stores the initial scrambling key RK0 as a current scrambling key SK0 into the key register 11 as shown in FIG. 3(e).

From the time TA1, the CPU 23 controls sequential DMA-transfer of the scrambled video data starting with a frame of video data FD0 to the video data area 21A of the system memory 21 via the general-purpose bus 26.

The scrambler 12 scrambles the frame of video data FD0 using the current scrambling key SK0 stored in the key register 11. Accordingly, the scrambled video data FD0 is output to the general-purpose bus 26 as shown in FIG. 3(b).

At a time TA2 which is a subsequent vertical sync timing, the transfer of the scrambled video data FD0 to the video data area 21A has already been completed. In this example, the notification section 15C of the scrambling key controller 15 creates update status information regarding the new scrambling key RK0 and send it to the CPU 23.

At a time TA3, the descrambler 23A of the CPU 23 starts descrambling the scrambled video data FD0 using the new scrambling the key RK0 that was sent to the video data sending device 10 and stored in the register 14 at the time TA0 as shown in FIG. 3(g). The descrambler 23A is notified of the scrambling key change to the new scrambling key RK0 by the update status information that was received from the scrambling key controller 15 at the time TA2. A delay time from TA2 to TA3 is caused by other software occupying the operating system on the CPU 23.

At a time TA4, the descrambler 23A of the CPU 23 starts descrambling a subsequent frame of scrambled video data FD1 using the scrambling key RK0 that was sent to the video data sending device 10 and stored in the register 14 at the time TA0 as shown in FIG. 3(g). At the same time, the scrambling key changer 23B sends a new scrambling key RK1 to the video data sending device 10 and it is stored in the register 14 as shown in FIG. 3(d).

At a time TA5 which is included in a vertical blanking period, the key update controller 15B stores the new scrambling key RK1 as a current scrambling key SK1 into the key register 11 as shown in FIG. 3(e). Here, a video data frame FD3 and following ones are scrambled by the scrambler 12 using the current scrambling key SK1.

At a time TA6, the transfer of the scrambled video data FD0 to the video data area 21A has already been completed. Accordingly, the notification section 15C of the scrambling key controller 15 creates update status information indicating that the current scrambling key has been changed to the new scrambling key RK1 and sends it to the CPU 23.

At a time TA7, the descrambler 23A of the CPU 23 starts descrambling the scrambled video data FD0 using the new scrambling key RK1 that was sent to the video data sending device 10 and stored in the register 14 at the time TA4 as shown in FIG. 3(g). The descrambler 23A is notified of the scrambling key change to the new scrambling key RK1 by the update status information that was received from the scrambling key controller 15 at the time TA6.

At a time TA8, the descrambler 23A of the CPU 23 start descrambling a subsequent frame of scrambled video data FD4 using the scrambling key RK1 that was sent to the video data sending device 10 and stored in the register 14 at the time TA4 as shown in FIG. 3(g). At the same time, the scrambling key changer 23B sends a new scrambling key RK2 to the video data sending device 10 and it is stored in the register 14 as shown in FIG. 3(d).

At a time TA9, the key update controller 15B stores the new scrambling key RK2 as a current scrambling key SK2 into the key register 11 as shown in FIG. 3(e). Accordingly, a video data frame FD6 and following ones are scrambled by the scrambler 12 using the current scrambling key SK2.

It is assumed that the operating system is put under increased load after the time TA8 and thereby, at time TA9, the descrambling of the scrambled video data FD4 has not been completed. In this case, the video frame data FD5 is discarded without being processed and the processing of the video frame data FD4 continues. Accordingly, the update status information changes at a time TA10 and the descrambler 23A starts descrambling the scrambled video frame data FD6 using the new scrambling key RK2.

As described above, according to the first embodiment of the present invention, a new scrambling key is previously stored in the register 14 and the current scrambling key stored in the key register 11 can be changed to the new one during vertical blanking based on a vertical sync signal of video data. Accordingly, even when transferring the video data, the scrambling key can be changed for each frame at the time of vertical blanking.

In addition, the descrambler 23A starts descrambling video frame data read out from the video data area 21A of the system memory 21 by monitoring the update status information received from the scrambling key controller 15 of the video data sending device 10. Accordingly, even when the CPU 23 is put under heavy load, causing video frame data to be discarded, a correct scrambling key can be identified, resulting in secure descrambling.

The scrambling scheme employed in the video data sending device 10 is not restricted to that of the first embodiment. According to a second embodiment of the present invention, a combination of a random key and a scrambling key may be used to scramble input video data. A circuit of a video data sending device 10 in the second embodiment is shown in FIG. 4.

Referring to FIG. 4, blocks similar to those previously described with reference to FIG. 1 are denoted by the same reference numerals and their descriptions are omitted. In the second embodiment, a random number generator 16 and a random key register 17 are added to the video data sending device 10 of the first embodiment.

The random number generator 16 may include a prime number counter and the like. A random number generated by the random number generator 16 is stored as a random key in the random key register 17. When the current scrambling key stored in the key register 11 is changed to a new scrambling key stored in the register 14, the random key register 17 stores a random number generated by the random number generator 16. The scrambler 12 uses the scrambling key stored in the key register register 17 to scramble the video data, resulting in enhanced scrambling of video data.

When the current scrambling key is changed, update status information including the random key stored in the random key register 17 may be sent to the descrambler 23A on the CPU 23. Accordingly, the descrambler 23A can descramble the scrambled video data to output the original video data to the graphics device 22.

As described above, according to the second embodiment of the present invention, the current scrambling key stored in the key register 11 can be changed to a new one and a random key is latched from the random number generator 16 during vertical blanking based on a vertical sync signal of video data. A combination of the new scrambling key and the random number is used to scramble video data. Accordingly, even when transferring the video data, the combined scrambling key can be changed for each frame at the timing of vertical blanking, resulting in further enhanced scrambling.

In addition, the descrambler 23A starts descrambling video frame data read out from the video data area 21A of the system memory 21 by monitoring the update status information including the random key received from the video data sending device 10. Accordingly, even when the CPU 23 is put under heavy load, causing video frame data to be discarded, a correct scrambling key composed of the scrambling key and the random key can be identified, resulting in secure descrambling.

The invention claimed is:

1. A control system for transfer of scrambled video data through an arbitrated access common bus line, comprising:
    a scrambling key memory for storing a current scrambling key;
    a descrambling key memory;
    a new scrambling key generator for generating a new scrambling key, storing said new scrambling key in said descrambling key memory, and transmitting a copy of said new scrambling key through the arbitrated common data bus;
    a vertical sync detector for detecting a vertical sync signal in a video data and generating a sync detect signal in response;
    a scrambling key update controller for receiving said copy of said new scrambling key from said arbitrated common data bus and, in response to said sync detect signal, updating said current scrambling key in said scrambling key memory according to said received copy of said new scrambling key;
    a scrambler for scrambling said video data using the current scrambling key, updated corresponding to said vertical sync by said scrambling key update controller, to produce scrambled video data, and transmitting said scrambled video data through said arbitrated common data bus; and
    a descrambler for descrambling the scrambled video data received through said arbitrated common data bus based on the new scrambling key stored in said descrambling key memory to produce an unscrambled form of said video data.

2. A control system for transfer of scrambled video data through an arbitrated common access data bus comprising:
    a new scrambling key generator for generating a new scrambling key and transmitting the new scrambling key through the arbitrated common access data bus;
    a scrambling key changer for receiving the new scrambling key from the arbitrated common access data bus and for changing a current scrambling key to the received new scrambling key, having
    a first key memory for storing the current scrambling key,
    a second key memory for storing the new scrambling key received from the arbitrated common access data bus,
    a vertical sync detector for detecting a vertical sync signal from a video data and for generating a corresponding vertical sync detection signal, and
    a memory controller for replacing the current scrambling key stored in the first key memory with the new scrambling key stored in the second key memory as a current scrambling key at a timing determined depending on the vertical sync detection signal;
    a scrambler for scrambling the video data, using the new scrambling key placed in the first key memory as the current scrambling key by the memory controller, to produce scrambled video data, and for transferring said scrambled video data through the arbitrated common access data bus; and
    a descrambler for descrambling the scrambled video data received through the arbitrated common access data bus based on the new scrambling key to produce original video data.

3. The control system of claim 2, wherein the video data has a vertical blanking interval synchronized to said vertical sync signal, and memory controller controls the first key memory in response to the vertical sync detection signal to stores the new scrambling key from the second key memory during the vertical blanking interval.

4. The control system of claim 2, wherein the memory controller notifies the descrambler, through the arbitrated common access data bus, that the current scrambling key has been replaced with the new scrambling key in the first key memory.

5. The control system of claim 2, further comprising:
    a random number generator for generating a random number; and
    a third key memory for storing a random key, based on said random number generated by the random number generator, when the memory controller replaces the current scrambling key with the new scrambling key,
    wherein the scrambler scrambles the video data using the current scrambling key and the random key and the descrambler descrambles the scrambled video data based on the current scrambling key and the random key.

6. The control system of claim 5, wherein the descrambler is notified through the arbitrated common access data bus that the new scrambling key has been stored as a current key scrambling key in the first key memory and that a combination of the new scrambling key and the random key is used to scramble the video data.

7. A method for transfer of scrambled video data through an arbitrated common data bus, comprising:
    storing a current scrambling key;
    generating a new scrambling key;
    storing said new scrambling key as a subsequent descrambling key;
    transmitting a copy of said new scrambling key onto said arbitrated common data bus;
    detecting said copy of said new scrambling key on said arbitrated common data bus and, based on said detection, receiving and storing said copy of said new scrambling key;
    detecting a vertical blanking period from an externally generated video data after said detecting said copy of said new scrambling key;
    in response to said detecting the vertical blanking period, updating said stored current scrambling key to a new current scrambling key in accordance with said stored copy of said new scrambling key;
    scrambling video data using said new current scrambling key to produce scrambled video data;
    transferring the scrambled video data through the arbitrated common access data bus;
    receiving the scrambled video data from the arbitrated common access data bus; and
    descrambling the received scrambled video data based on said subsequent descrambling key to produce original video data.

8. The control method of claim 7, wherein the video data comprises a plurality of successive frames of video data synchronized to a periodic vertical sync signal, wherein at least one of said frames of video data is scrambled using the new current scrambling key to generate at least one frame of first scrambled video data, during a first frame period, and a frame of first scrambled video data is descrambled based on the new scrambling key during a frame period subsequent to said first frame period.

9. The control method of claim 8, wherein, when a scrambling key in a scrambling key memory is replaced with the new scrambling key during the vertical blanking period between a first frame period and a second frame period, update status information indicating occurrence of a scrambling key change is created and transferred through said arbitrated common access data bus to the scrambling key changer, Wherein a first frame of scrambled video data is descrambled in the second frame period based on the scrambling key in a descrambling key memory prior to it being changed to the new scrambling key; and A second frame of scrambled video data is descrambled in a third frame period following the second frame period based on the new scrambling key in the descrambling key memory after it is changed to the new scrambling key.

10. The control method of claim 7, further comprising:
generating a random number; and
storing a random key that is a random number generated when the new scrambling key is set as a current scrambling key,
wherein the video data is scrambled using the current scrambling key and the random key, and the scrambled video data is descrambled based on the current scrambling key and the random key.

11. A computer readable storage medium containing a set of instructions for a general purpose computer having an arbitrated common access data bus, a video scrambler connected to said bus, the set of instructions comprising:

Detecting when a new scrambling key generated by a scrambling key generator connected to said arbitrated common access data bus is transferred through said bus and is loaded into a first memory in said video scrambler unit connected to said bus;

After said detecting of a new scrambling key being generated, transferred through said arbitrated bus and loaded into said first memory, detecting a vertical blanking period from the video data;

In response to said detecting a vertical blanking period, updating, during vertical blanking, a current scrambling key based on said new scrambling key in said first memory;

scrambling video data using said updated current scrambling key to produce scrambled video data;

transferring the scrambled video data through the arbitrated common access data bus; and descrambling the scrambled video data received through the arbitrated common access data bus based on said new scrambling key to produce original video data.

* * * * *